US012498109B2

(12) United States Patent
Wang et al.

(10) Patent No.: US 12,498,109 B2
(45) Date of Patent: Dec. 16, 2025

(54) DOWNLIGHT AND DOWNLIGHT ASSEMBLY THEREOF

(71) Applicant: Shenzhen KOK Technology., Ltd, Guangdong (CN)

(72) Inventors: Binping Wang, Guangdong (CN); Jinke Liu, Guangdong (CN)

(73) Assignee: Shenzhen KOK Technology., Ltd, Shenzhen (CN)

( * ) Notice: Subject to any disclaimer, the term of this patent is extended or adjusted under 35 U.S.C. 154(b) by 0 days.

(21) Appl. No.: 18/655,151

(22) Filed: May 3, 2024

(65) Prior Publication Data

US 2025/0305669 A1 Oct. 2, 2025

(30) Foreign Application Priority Data

Mar. 28, 2024 (CN) ........................ 202410372350.4

(51) Int. Cl.

| | |
|---|---|
| ***F21K 9/238*** | (2016.01) |
| ***F21S 8/02*** | (2006.01) |
| ***F21V 23/00*** | (2015.01) |
| ***F21V 23/02*** | (2006.01) |
| ***F21V 23/06*** | (2006.01) |
| ***F21V 25/10*** | (2006.01) |
| ***H01R 13/713*** | (2006.01) |

(52) U.S. Cl.

CPC .............. *F21V 23/06* (2013.01); *F21S 8/026* (2013.01); *F21V 23/001* (2013.01); *F21V 23/008* (2013.01); *F21V 23/026* (2013.01); *F21V 25/10* (2013.01); *H01R 13/7132* (2013.01)

(58) Field of Classification Search

CPC ...... F21V 23/06; F21V 23/001; F21V 23/008; F21V 23/026; F21V 25/10; F21S 8/026; H01R 13/7132

See application file for complete search history.

(56) References Cited

U.S. PATENT DOCUMENTS

| | | | | |
|---|---|---|---|---|
| 9,557,021 | B2 * | 1/2017 | Madden | F21V 29/70 |
| 2013/0300310 | A1 * | 11/2013 | Hu | H05B 45/3725 315/254 |
| 2021/0317956 | A1 * | 10/2021 | Jeswani | F21V 21/04 |

* cited by examiner

*Primary Examiner* — Elmito Breval

(57) ABSTRACT

The present disclosure provides a downlight and a downlight assembly thereof, and the downlight assembly includes the downlight and a power supply electrically connected to the downlight, the downlight including a first wiring member, and the power supply including a second wiring member electrically connected to the first wiring member; the downlight assembly further includes a protection member connected to the first wiring member and including a freeing member arranged on a top portion of the first wiring member, a limiting member installed inside the first wiring member, and a power-off member installed inside the limiting member and configured to connect and disconnect the first and second wiring members, the freeing member configured to adsorb the limiting member when a voltage supplied by the power supply is too great, so as to quickly disconnect the first wiring member and the second wiring member through the power-off member.

17 Claims, 5 Drawing Sheets

DOWNLIGHT AND DOWNLIGHT ASSEMBLY THEREOF

CROSS-REFERENCE TO RELATED APPLICATION

This application claims the benefit of priority from Chinese Patent Application No. 202410372350.4 entitled "HIGH STABILITY MODULAR DOWNLIGHT ASSEMBLY" and filed on Mar. 28, 2024, the content of which is hereby incorporated by reference in its entire by reference.

BACKGROUND

2. Technical Field

The present disclosure generally relates to the field of lighting devices, and especially relates to a downlight and a downlight assembly thereof.

3. Description of Related Art

A downlight is a concealed lamp embedded inside a ceiling, so that all light of the downlight is projected downwardly and belongs to a direct light distribution device. Different reflectors, lenses, blinds and bulbs can be used to obtain different light effects thereof. The downlight doesn't occupy a space to increase a soft atmosphere of the space. If a warm feeling needs to be created, a plurality of downlights can be installed to reduce space oppression, which is generally used more in hotels, homes and cafes.

The conventional downlights on the market lack a repeatable power-off protection structure, so that it is impossible to test the downlight for a plurality of times for powering on the downlight to quickly reuse the downlight after emergency power outages are occurred.

SUMMARY

The technical problems to be solved: in view of the shortcomings of the related art, the present disclosure provides a downlight and a downlight assembly thereof which can have a reusable power-off protection structure, can be tested for a plurality of times for powering on the downlight, can be quickly reused after emergency power outages is occurred, and provide a connecting member thereof to improve installation flexibility of the downlight.

In a first aspect, a downlight assembly according to an embodiment of the present disclosure includes a downlight and a power supply electrically connected to the downlight, the downlight including a first wiring member and the power supply including a second wiring member electrically connected to the first wiring member; and wherein the downlight assembly further includes a protection member connected to the first wiring member, the protection member including a freeing member, a limiting member and a power-off member, the freeing member arranged on a top portion of the first wiring member, the limiting member installed inside the first wiring member, and the power-off member installed inside the limiting member and configured to connect and disconnect the first wiring member and the second wiring member; and wherein the freeing member is configured to adsorb the limiting member when a voltage supplied by the power supply is too great, so as to quickly disconnect the first wiring member and the second wiring member through the power-off member, for protecting the power supply.

In a second aspect, a downlight according to an embodiment of the present disclosure includes a body, a connecting member and a diffusion cover, one end of the connecting member detachably connected to the body, the other end of the connecting member fixedly connected to the diffusion cover, the downlight electrically connected to a power supply, the body including a first wiring member and a protection member connected to the first wiring member, the power supply including a second wiring member electrically connected to the first wiring member, the protection member including a freeing member, a limiting member and a power-off member, the freeing member arranged on a top portion of the first wiring member, the limiting member installed inside the first wiring member, the power-off member installed inside the limiting member and configured to connect and disconnect the first wiring member and the second wiring member; and wherein the freeing member is configured to adsorb the limiting member when a voltage supplied by the power supply is too great, so as to quickly disconnect the first wiring member and the second wiring member through the power-off member.

The present disclosure provides the advantages as below: the present disclosure provides a downlight assembly with a protection member thereof, the protection member configured to disconnect the first wiring member and the second wiring member when a voltage supplied by the power supply is too great, and the protection member can be reinserted after the power outage is occurred, so that a repeated power outage protection for the downlight can be obtained; and then, the present disclosure further provides the connecting member to quickly replace diffusion covers with different specifications, so that an efficiency of replacing the diffusion covers can be improved.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

The element labels according to the embodiment of the present disclosure shown as below:

10 downlight, 11 first wiring member, 12 body, 121 clamp, 122 positioning portion, 123 elastic arm, 13 connecting member, 131 clamping groove, 132 opening, 133 installing portion, 14 diffusion cover, 111 wire, 112 sleeve, a top portion, 20 power supply, 21 second wiring member, 211 wiring terminal, 22 main power source, 23 installing sleeve, 24 power cord, 30 protection member, 31 freeing member, 311 micro-transformer, 312 electromagnet, 32 limiting member, 321 cone barrel, b upper portion, e lower portion, 322 guiding plate, 323 limiting ball, 33 power-off member, 331 wiring plate, 332 limiting pin, c top end, d bottom end, 333 limiting spring, f upper end, g lower end, h one end, i the other end, j above the micro-transformer.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

It should also be further understood that the term "and/or" used in the description of the present disclosure and the appended claims refers to any combination of one or more of associated listed items and all possible combinations, and includes these combinations.

Figure 1:
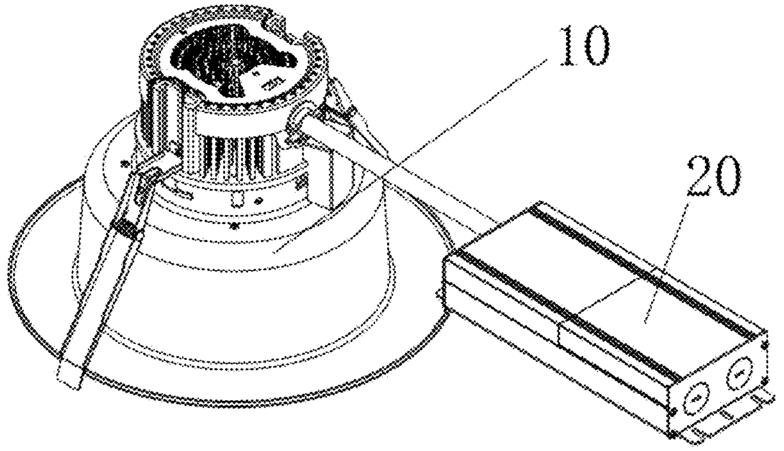
FIG. 1 is a schematic view of a downlight assembly in accordance with an embodiment of the present disclosure.
Figure 2:
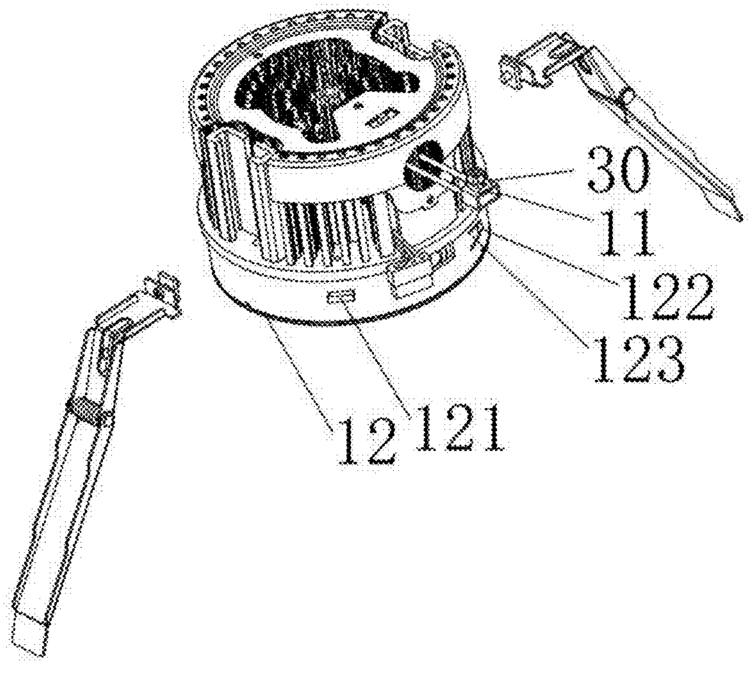
FIG. 2 is a schematic view of a downlight in accordance with an embodiment of the present disclosure.
Figure 3:
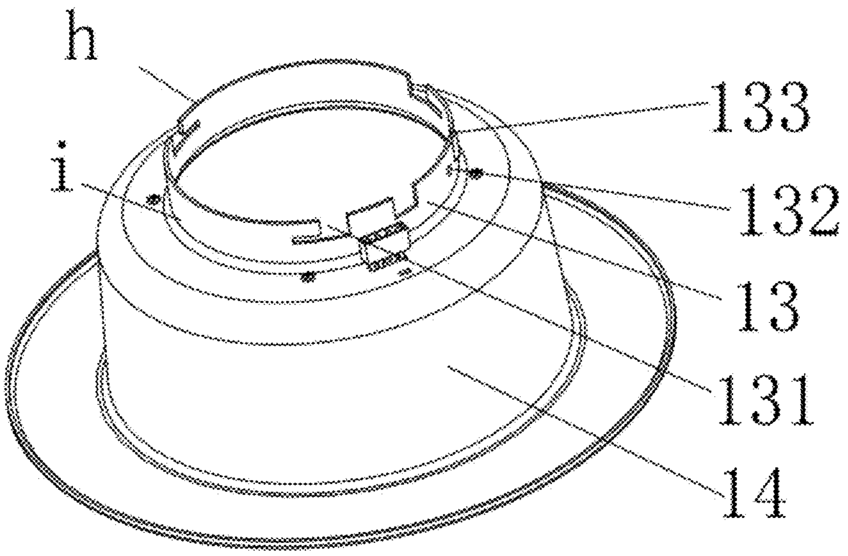
FIG. 3 is a schematic view of a connecting member and a diffusion cover of the downlight of FIG. 2.
Figure 4:
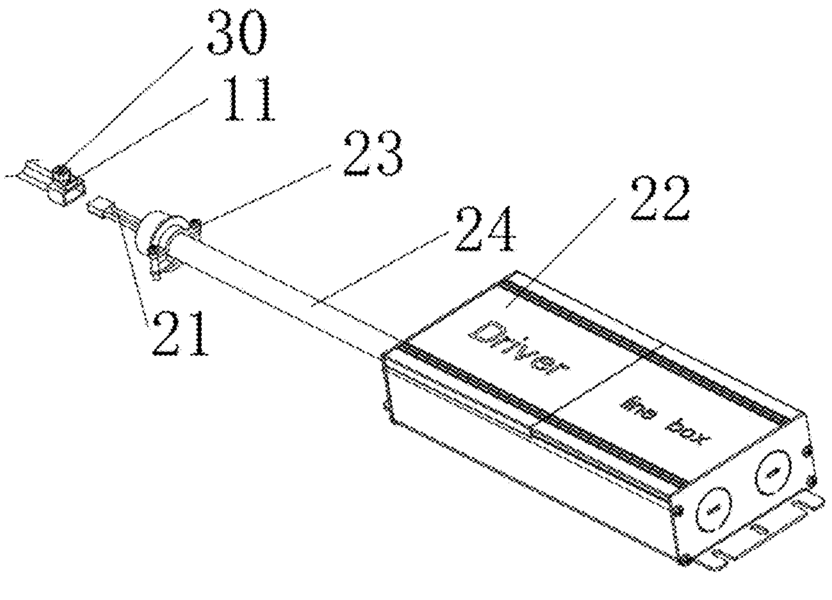
FIG. 4 is a schematic view of a power supply of the downlight assembly of FIG. 1.
Figure 5:
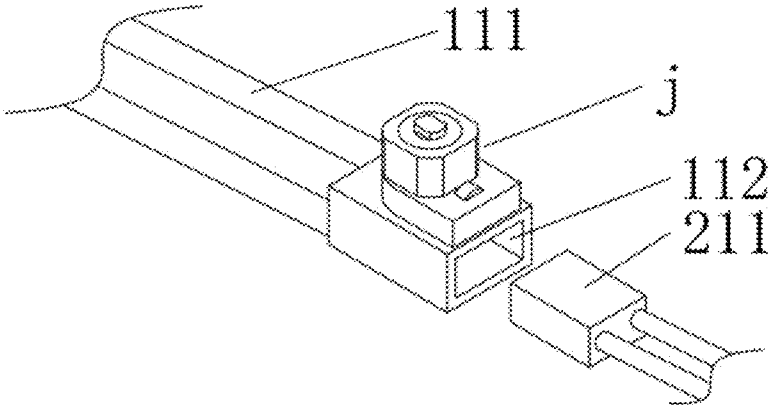
FIG. 5 is a schematic view of a first wiring member and a second wiring member of the downlight of FIG. 2.
Figure 6:
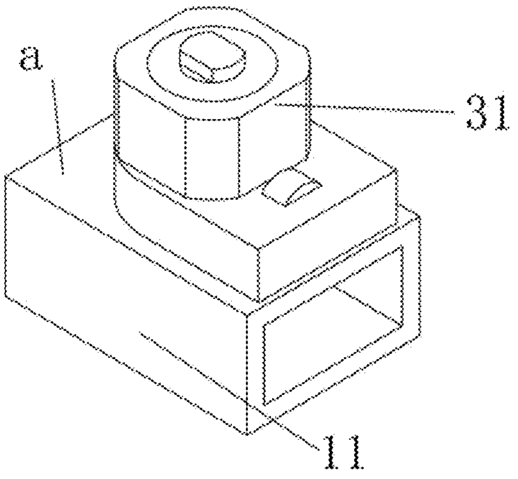
FIG. 6 is a schematic view of the first wiring member and a freeing member of the downlight of FIG. 2.
Figure 7:
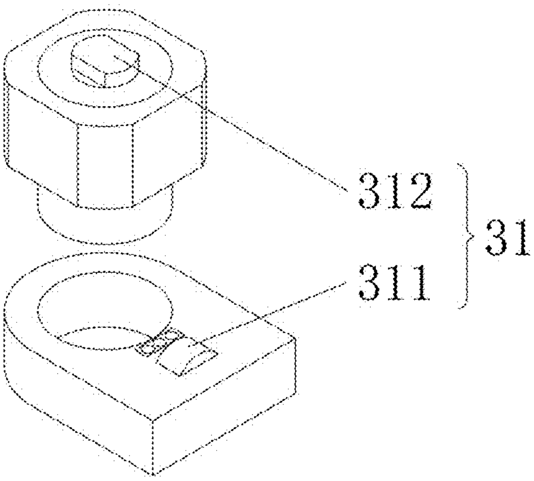
FIG. 7 is a schematic view of the freeing member of the downlight of FIG. 2.
Figure 8:
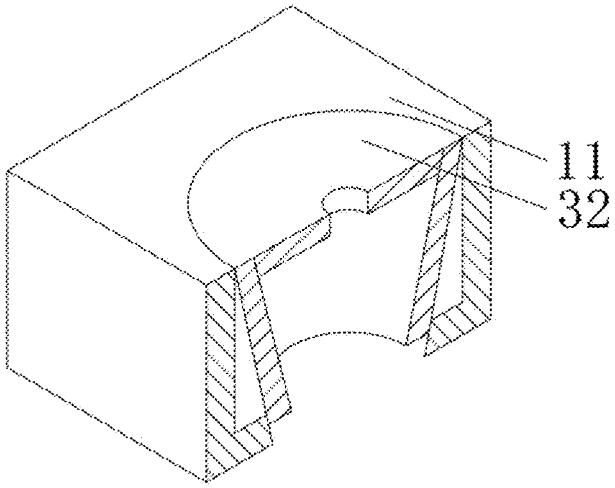
FIG. 8 is a schematic view of the first wiring member and a limiting member of the downlight of FIG. 2.
Figure 9:
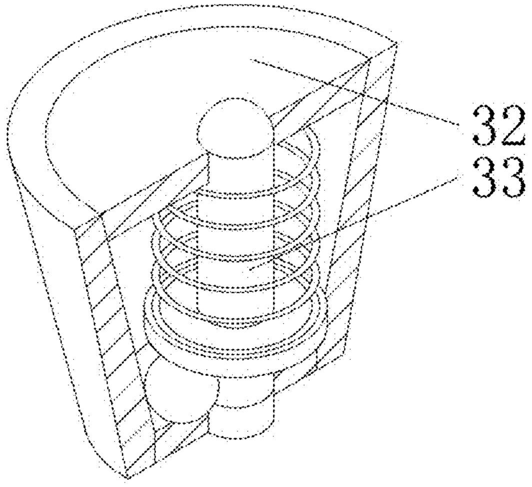
FIG. 9 is a schematic view of the limiting member and a power-off member of the downlight of FIG. 2.
Figure 10:
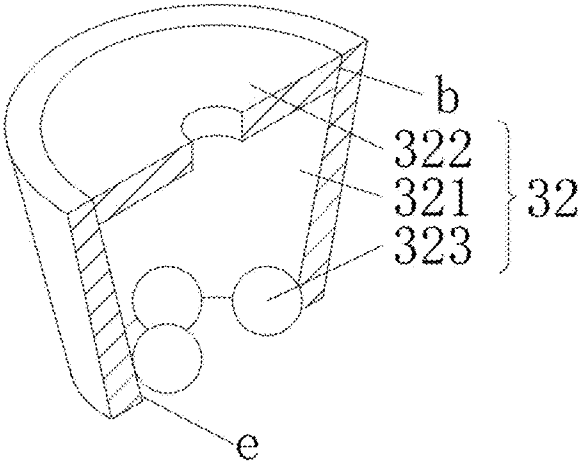
FIG. 10 is a schematic view of the limiting member of the downlight of FIG. 2.
Figure 11:
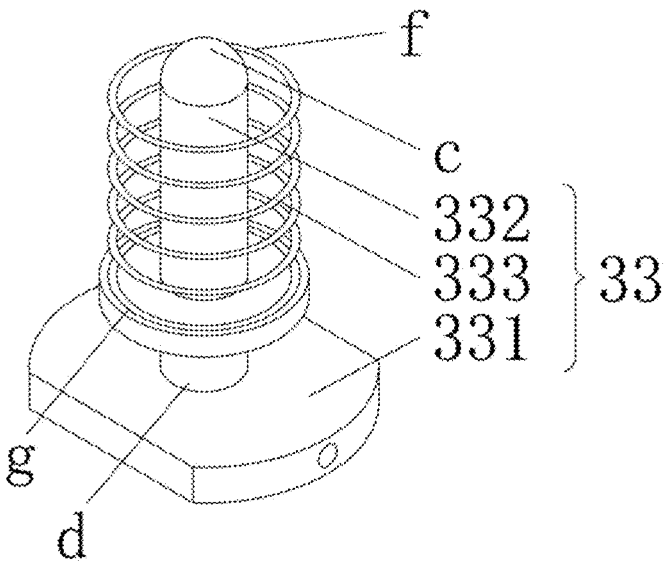
FIG. 11 is a schematic view of the power-off member of the downlight of FIG. 2.

Referring to FIGS. 1-11, a downlight assembly in accordance with an embodiment of the present disclosure includes a downlight 10 and a power supply 20 electrically connected to the downlight 10 for supplying power for the downlight 10, so that the downlight 10 emits light for illumination. The downlight 10 includes a first wiring member 11 and the power supply 20 includes a second wiring member 21 electrically connected to the first wiring member 11. The downlight 10 further includes a protection member 30 connected to the first wiring member 11 and configured to connect and disconnect the first wiring member 11 and the second wiring member 21. When a voltage supplied by the power supply 20 is too great, the first wiring member 11 is disconnected from the second wiring member 21, and the first wiring member 11 can be manually reset to connect to the second wiring member 21 after the power outage is occurred, so as to repeatedly provide power outage protection for the downlight 10. It should be noted that the voltage is too great mentioned above is referred to the voltage higher than a voltage that the power supply 20 can withstand.

The protection member 30 includes a freeing member 31, a limiting member 32 and a power-off member 33, the freeing member 31 arranged on a top portion a of the first wiring member 11, the limiting member 32 installed inside the first wiring member 11, and the power-off member 33 installed inside the limiting member 32 and configured to connect and disconnect the first wiring member 11 and the second wiring member 21; and wherein the freeing member 31 is configured to adsorb the limiting member 32 when a voltage supplied by the power supply 20 is too great, so as to quickly disconnect the first wiring member 11 and the second wiring member 21 through the power-off member 33, which allows for immediate power-off for protecting the power supply 20 and improving safety during using the power supply 20.

The first wiring member 11 includes a wire 111 and a sleeve 112 connected to an end of the wire 111 and configured to clamp with a wiring terminal 211 of the second wiring member 21. The freeing member 31 includes a micro-transformer 311 installed on the sleeve 112, and an electromagnet 312 installed above the micro-transformer 311. The micro-transformer 311 is configured to convert a voltage transmitted by the second wiring member 21 into a voltage that can be used by the electromagnet 312, and transmit to the electromagnet 312. After the electromagnet 312 is powered on and started, the electromagnet 312 adsorbs the limiting member 32 upwards to release the power-off member 33 that is limited by the limiting member 32, in order to achieve a purpose that power outage is occurred. At this time, the first wiring member 11 the second wiring member 21 are disconnected with each other. In an embodiment of the present disclosure, when the limiting member 32 limits the power-off member 33, the first wiring member 11 and the second wiring member 21 are electrically connected, thereby achieving the purpose that the downlight 10 is powered on.

The limiting member 32 includes a cone barrel 321, a guiding plate 322 and a plurality of limiting balls 323. The cone barrel 321 is installed in the sleeve 112 and vertically arranged on the limiting member 32, and a size of one end of the cone barrel 321 close to the guiding plate 322 is greater than that of the other end of the cone barrel 321 (that is, an upper opening of the cone barrel 321 is larger than a lower opening of the cone barrel 321). The guiding plate 322 is installed on an upper portion b of the cone barrel 321 and the plurality of limiting balls 323 is received in the cone barrel 321. By setting the limiting member 32, the cone barrel 321 can limit movement of the plurality of limiting balls 323, and the cone barrel 321 itself is a conical structure with a large upper portion and a small lower portion. The guiding plate 322 can limit a movement of the power-off member 33. When the plurality of limiting balls 323 moves downwards, the plurality of limiting balls 323 gradually clamps with the power-off member 33, thereby limiting a position of the power-off member 33. The plurality of limiting balls 323 is a metal sphere that can move upwards under a magnetic force when the electromagnet 312 is activated, thereby releasing a clamping with the power-off member 33.

The power-off member 33 includes a wiring plate 331, a limiting pin 332 and a limiting spring 333, a lower portion c of the limiting pin 332 passing through the guiding plate 322 and sliding relative to the guiding plate 322. The wiring plate 331 is arranged at a bottom end d of the limiting pin 332 and located at the lower portion e of the cone barrel 321, the wiring plate 331 configured to electrically connect the first wiring member 11 and the second wiring member 21. The limiting spring 333 sleeves on the limiting pin 332, an upper end f of the limiting spring 333 abutting against the guiding plate 322, and a lower end g of the limiting spring 333 abutting against the plurality of limiting balls 323. When the limiting pin 332 comes into contact with the limiting ball 323, that is, when the limiting ball 323 clamps with the limiting pin 332, the limiting ball 323 is limited. At this time, the wiring plate 331 is located in a connection position thereof, and the first wiring member 11 is electrically connected to the second wiring member 21. When the limiting ball 323 is not in contact with the limiting pin 332, that is, when the electromagnet 312 adsorbs the limiting ball 323 upwardly, the limiting ball 323 releases a limit with the limiting pin 332. At this time, the limiting ball 323 drives the wiring plate 331 to fall down under an action of gravity, thereby releasing an electrical connection between the wiring plate 331 and both of the first wiring member 11 and the second wiring member 21.

A usage process is as follows: first, the second wiring member 21 is connected to the first wiring member 11 through the protection member 30 to transfer electrical energy to the downlight 10. When the voltage of the power supply 20 is too great, electrical energy is transmitted to the micro-transformer 311. The micro-transformer 311 converts the voltage into electrical energy that is used by the electromagnet 312, the electromagnet 312 starts to adsorb the limiting ball 323 upwardly, so that the limiting ball 323 drives the limiting spring 333 to move upwardly, and the limiting ball 323 releases a compression of the limiting pin 332. The limiting pin 332 drives the wiring plate 331 to fall off under the action of gravity, in this way, the wiring plate 331 will disconnect the electrical connection between the first wiring member 11 and the second wiring member 21, thereby disconnecting a circuit of the downlight 10. When power supply needs to be restored, the power supply 20 is turned off and the limiting pin 332 is reinserted into the cone barrel 321 until the limiting pin 332 passes through the guiding plate 322. Then, the limiting ball 323 will move downwards along the cone barrel 321 by following with the limiting spring 333, and gradually come into contact with the limiting pin 332. When the limiting ball 323 moves to the lower portion e of the cone barrel 321, the limiting ball 323 clamps with the limiting pin 332. At this time, the first wiring member 11 is electrically connected to the second wiring member 21. At the same time, if the voltage is too great again, the electromagnet 312 adsorbs the limiting ball 323 upwardly, and drives the limiting spring 333 to move upwardly. The limiting ball 323 releases the compression on the limiting pin 332, so that the limiting pin 332 drive the wiring plate 331 to fall off under the action of gravity. The wiring plate 331 releases the electrical connection between the first terminal member 11 and the second terminal member 21, thereby disconnecting the circuit thereof. If power needs to be restored again, the limiting pin 332 is reinserted into the cone barrel 321 to move downwardly along the cone barrel 321, and gradually come into contact with the limiting pin 332. When the limiting pin 332 moves to the lower portion e of the cone barrel 321, the limiting pin 332 clamps with the limiting pin 332 to electrically connect the first wiring member 11 to the second wiring member 21, which is repeatedly.

In an optional embodiment of the present disclosure, the downlight 10 further includes a body 12, a connecting member 13 and a diffusion cover 14, one end h of the connecting member 13 detachably connected to the body 12, and the other end i of the connecting member 13 connected to the diffusion cover 14. Specifications of the diffusion covers 14 are different, for example, there are three types of specifications: an upper specification, a medium specification and a lower specification. By setting the connecting member 13, the diffusion cover 14 can be quickly replaced. Different diffusion covers 14 have different light angles, and by detachable setting the connecting member 13, the diffusion covers 14 with different specifications can be quickly replaced, thereby improving a replacement efficiency of the diffusion cover 14.

In some embodiments of the present disclosure, the connecting member 13 and the diffusion cover 14 are integrated with each other to reduce the number of components and assembly costs thereof. The connecting member 13 that is arranged on the diffusion cover 14 with different specifications should be of the same size.

The connecting member 13 is circular and includes a plurality of L-shaped clamping grooves 131, and the body 12 includes a clamp 121 matched with the plurality of clamping grooves 131 and clamped inside the plurality of clamping grooves 131. Specifically, during installing the connecting member 13, the clamping groove 131 of the connecting member 13 is aligned with the clamp 121 of the tube body 12, and then the connecting member 13 rotates, so that the clamp 121 rotates to a tail of the clamping groove 131 to position the connecting member 13 and the body 12. When needing to replace the connecting member 13, rotating the connecting member 13 until an opening position of the clamping groove 131 rotates to a position of the clamp 121, at this time, removing the connecting member 13 to disassemble the connecting member 13.

The connecting member 13 further includes an installing portion 133, and the body 12 includes a protrusion 122 received in the installing portion 133. The connecting member 13 further includes an opening 132 corresponding to the protrusion 122, when the clamp 121 is securely fastened, the protrusion 122 is received in the opening 133. The protrusion 122 plays as a positioning role. When the clamp 121 is in place, the protrusion 122 is located inside the opening 132, and the connecting member 13 and the body 12 are positioned through the protrusion 122 and the opening 132. The installing portion 133 plays as a role of preventing confusion and facilitating installation. During installation, first the protrusion 122 is inserted along the installing portion 133, to make it convenient for operators to operate (compared to aligning with the plurality of clamping grooves 131, the operator only needs to align the protrusion 122 with the installing portion 133 to insert the protrusion 122, with only one reference object, thereby making it convenient for the operator to operate the connecting member 13). After the protrusion 122 is inserted in place, the connecting member 13 rotates again so as to rotate the clamp 121 of the body 12 into a corresponding position, at this time, the protrusion 12 rotates into the opening 132 for positioning the connecting member 13. In a preferred embodiment of the present disclosure, the protrusion 122 is connected to the body 12 through an elastic arm 123, so that the protrusion 122 has a certain degree of elasticity for easy installation and disassembly.

The power supply 20 further includes a main power source 22, an installing sleeve 23 and a power cord 24, the second wiring member 21 connected to the main power source 22 through the power cord 24, the installing sleeve 23 installed on the body 12, and the power cord 24 clamped inside the installing sleeve 23.

A downlight 10 according to an embodiment of the present disclosure includes a body 12, a connecting member 13 and a diffusion cover 14, one end of the connecting member 13 detachably connected to the body 12, the other end of the connecting member 13 fixedly connected to the diffusion cover 14, the downlight 10 electrically connected to a power supply 20, the body 12 including a first wiring member 11 and a protection member 30 connected to the first wiring member 11. The power supply 20 includes a second wiring member 21 electrically connected to the first wiring member 11, the protection member 30 including a freeing member 31, a limiting member 32 and a power-off member 33, the freeing member 31 arranged on a top portion a of the first wiring member 11, the limiting member 32 installed inside the first wiring member 11, the power-off member 33 installed inside the limiting member 32 and configured to connect and disconnect the first wiring member 11 and the second wiring member 21; and wherein the freeing member 31 is configured to adsorb the limiting member 32 when a voltage supplied by the power supply 20 is too great, so as to quickly disconnect the first wiring member 11 and the second wiring member 21 through the power-off member 33.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A downlight assembly comprising a downlight and a power supply electrically connected to the downlight, the downlight comprising a first wiring member and the power supply comprising a second wiring member electrically connected to the first wiring member; and wherein the downlight assembly further comprises a protection member connected to the first wiring member, the protection member comprising a freeing member, a limiting member and a power-off member, the freeing member arranged on a top portion of the first wiring member, the limiting member installed inside the first wiring member, and the power-off member installed inside the limiting member and configured to connect and disconnect the first wiring member and the second wiring member; and wherein the freeing member is configured to adsorb the limiting member when a voltage supplied by the power supply is too great, so as to quickly disconnect the first wiring member and the second wiring member through the power-off member, for protecting the power supply; and wherein the first wiring member comprises a wire and a sleeve connected to the wire and the second wiring member; and wherein the freeing member comprises a micro-transformer installed on the sleeve, and an electromagnet installed above the micro-transformer.

2. The downlight assembly as claimed in claim 1, wherein the limiting member comprises a cone barrel installed in the sleeve, a guiding plate installed on an upper portion of the cone barrel, and a plurality of limiting balls received in the cone barrel.

3. The downlight assembly as claimed in claim 2, wherein the cone barrel is vertically arranged, and a size of the upper portion of the cone barrel is larger than that of a lower portion of the cone barrel.

4. The downlight assembly as claimed in claim 3, wherein the power-off member comprises a wiring plate, a limiting pin and a limiting spring; the limiting pin passing through the guiding plate and sliding relative to the guiding plate; the wiring plate arranged at a bottom end of the limiting pin and located at the lower portion of the cone barrel; the limiting spring sleeved on the limiting pin, an upper end of the limiting spring abutting against the guiding plate, and a lower end of the limiting spring abutting against the plurality of limiting balls.

5. The downlight assembly as claimed in claim 4, wherein when the plurality of limiting balls clamps with the limiting pin, the plurality of limiting balls is limited and the wiring plate is located in a connection position thereof, and the first wiring member is electrically connected to the second wiring member; when the electromagnet absorbs the plurality of limiting balls upwardly, the plurality of limiting balls is released from the limiting pin, and the plurality of limiting balls drives the wiring plate to fall downwards under an action of gravity to release an electrical connection between the wiring plate and both of the first wiring member and the second wiring member.

6. The downlight assembly as claimed in claim 5, wherein the power supply further comprises a main power source, an installing sleeve and a power cord, the second wiring member connected to the main power source through the power cord, the installing sleeve installed on the body, and the power cord clamped inside the installing sleeve.

7. The downlight assembly as claimed in claim 1, wherein the downlight further comprises a body, a connecting member and a diffusion cover, one end of the connecting member detachably connected to the body, and the other end of the connecting member connected to the diffusion cover.

8. The downlight assembly as claimed in claim 7, wherein the connecting member is circular and comprises a plurality of clamping grooves, wherein a first of the plurality of clamping grooves is L-shaped, and the body comprises a clamp matched with the plurality of clamping grooves and clamped inside the plurality of clamping grooves.

9. The downlight assembly as claimed in claim 8, wherein the plurality of clamping grooves is uniformly arranged around an axis of the connecting member.

10. The downlight assembly as claimed in claim 9, wherein the connecting member further comprises an opening corresponding to the protrusion, when the clamp is clamped into the plurality of clamping grooves, the protrusion is received in the opening to position the connecting member and the body.

11. The downlight assembly as claimed in claim 8, wherein the connecting member further comprises an installing portion, and the body comprises a protrusion received in the installing portion.

12. A downlight comprising a body, a connecting member and a diffusion cover, one end of the connecting member detachably connected to the body, the other end of the connecting member fixedly connected to the diffusion cover, the downlight electrically connected to a power supply, the body comprising a first wiring member and a protection member connected to the first wiring member, the power supply comprising a second wiring member electrically connected to the first wiring member, the protection member comprising a freeing member, a limiting member and a power-off member, the freeing member arranged on a top portion of the first wiring member, the limiting member installed inside the first wiring member, the power-off member installed inside the limiting member and configured to connect and disconnect the first wiring member and the second wiring member; and wherein the freeing member is configured to adsorb the limiting member when a voltage supplied by the power supply is too great, so as to quickly disconnect the first wiring member and the second wiring member through the power-off member; and wherein the first wiring member comprises a wire and a sleeve connected to the wire and the second wiring member; and wherein the freeing member comprises a micro-transformer installed on the sleeve, and an electromagnet installed above the micro-transformer.

13. The downlight as claimed in claim 12, wherein the connecting member is integrated with the diffusion cover.

14. The downlight as claimed in claim 12, wherein the connecting member is circular and comprises a plurality of clamping grooves, wherein each of the plurality of clamping grooves is L-shaped, and the body comprises a clamp matched with the plurality of lamping grooves and clamped inside the plurality of clamping grooves.

15. The downlight as claimed in claim 14, wherein the connecting member further comprises an installing portion, and the body comprises a protrusion received in the installing portion.

16. The downlight as claimed in claim 15, wherein the connecting member further comprises an opening corresponding to the protrusion, when the clamp is clamped into the plurality of clamping grooves, the protrusion is received in the opening to position the connecting member and the body.

17. The downlight as claimed in claim 14, wherein the number of the plurality of clamping grooves is three, the three clamping grooves are uniformly arranged around an axis of the connecting member.

* * * * *